United States Patent
Balamuth

[15] 3,635,609
[45] Jan. 18, 1972

[54] APPARATUS FOR EMBOSSING OF MATERIALS WITH HIGH-FREQUENCY VIBRATIONS

[72] Inventor: Lewis Balamuth, Washington Square West, New York, N.Y.

[73] Assignee: Cavitron Corporation, Long Island, N.Y.

[22] Filed: July 26, 1968

[21] Appl. No.: 751,008

Related U.S. Application Data

[63] Continuation of Ser. No. 572,064, Aug. 12, 1966, abandoned.

[52] U.S. Cl. ................................425/3, 264/23, 425/299, 425/303, 425/385, 425/396
[51] Int. Cl. ........................................................B30b 15/00
[58] Field of Search.....................18/1, 16 M, 16 F, 10, 19 A, 18/17 H; 264/23, 22, 24; 25/41 J; 72/56, 429, 430, 453

[56] References Cited

UNITED STATES PATENTS

| 1,954,635 | 4/1934 | Leonard | 18/10 |
|---|---|---|---|
| 2,414,177 | 1/1947 | Smith | 18/19 A UX |
| 2,815,535 | 12/1957 | Bodine | 25/41 J X |
| 2,909,826 | 10/1959 | McElroy | 25/41 J |
| 3,022,814 | 2/1962 | Bodine | 264/22 X |
| 3,146,492 | 9/1964 | Lemelson | 18/10 |
| 3,283,378 | 11/1966 | Cramton | 18/10 X |
| 3,298,065 | 1/1967 | Pendleton | 264/23 X |
| 3,323,446 | 6/1967 | Alpini | 18/16 F X |

*Primary Examiner*—J. Howard Flint, Jr.
*Attorney*—Edwin C. Pearson

[57] ABSTRACT

A workpiece which is to have a raised pattern applied to at least one surface thereof is positioned in the apparatus between a support member and a die member, the surface of the die member being a reverse image of the desired pattern. While the die member and workpiece are held in contact by a static force, high-frequency vibrations are applied to impress the pattern on at least one surface of the workpiece. Several alternate embodiments involve rotating dies or relative movement between the source of vibrations and the die and workpiece in a plane perpendicular to the direction of the high-frequency vibrations.

12 Claims, 11 Drawing Figures

3,635,609

INVENTOR
LEWIS BALAMUTH

BY

Leonard W. Suroff
ATTORNEY

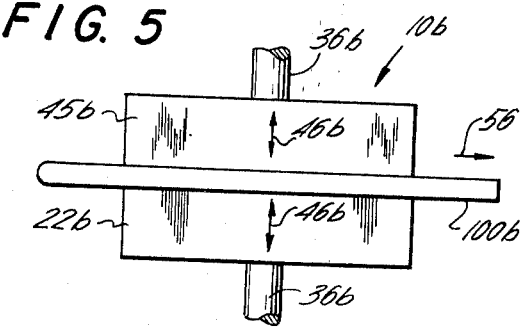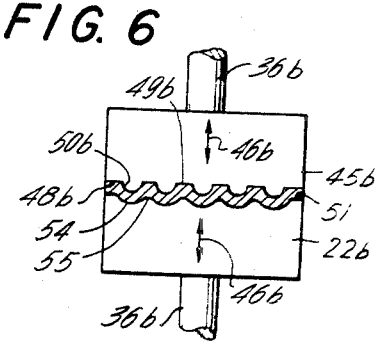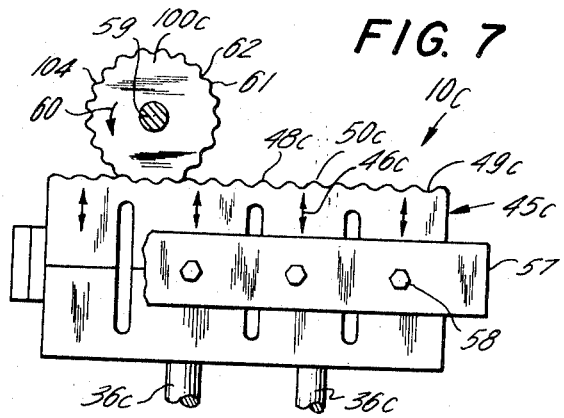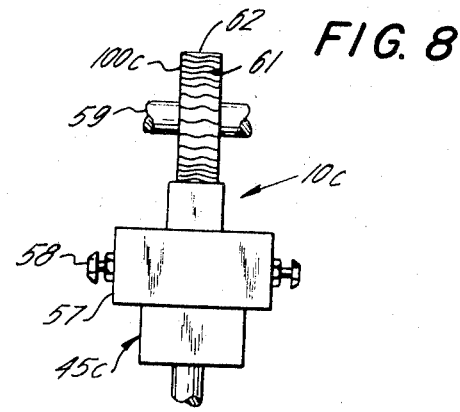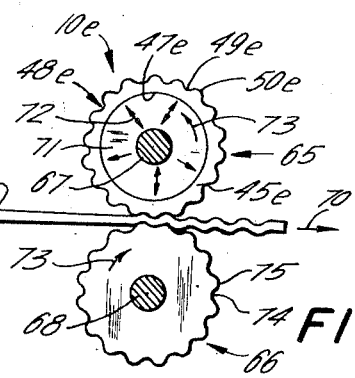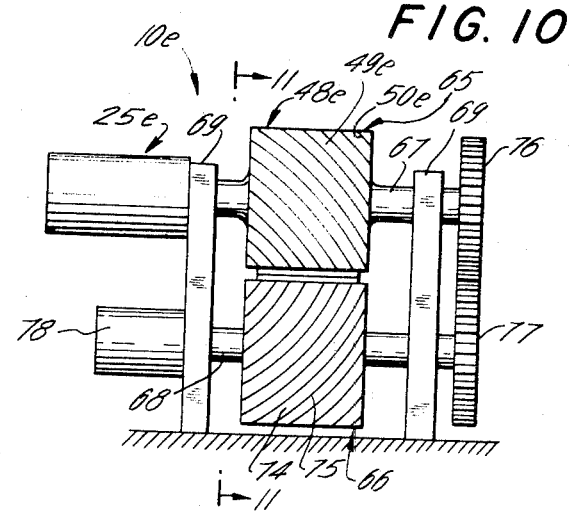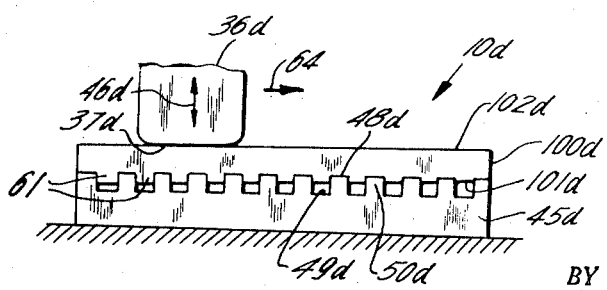

APPARATUS FOR EMBOSSING OF MATERIALS WITH HIGH-FREQUENCY VIBRATIONS

This application is a continuation of application Ser. No. 572,064, filed Aug. 12, 1966 and now abandoned.

This invention relates generally to an improved apparatus for impressing low relief patterns into a wide variety of materials and more particularly, is directed to embossing a work member or the like, employing high-frequency, preferably ultrasonic vibrations for the embossing operation.

In general, embossing consists in applying forces which cause the material of the work member, to be shaped, to flow into preformed die surfaces of a die member whereby a replica of the die pattern in reverse is produced. In this way, not only continuous patterns of repeating design may be formed, but also individual cameo or intaglio forms of great beauty reproduced.

The primary object of the invention is to provide improved apparatus for the embossing of materials.

A further object of the invention is to provide improved apparatus for the embossing of materials utilizing ultrasonic energy.

Another object of the present invention is to provide improved apparatus to emboss a variety of materials at pressures and temperatures much reduced as compared with known embossing techniques.

Yet another object of the invention is to provide improved apparatus for introducing high-frequency vibratory energy in the deformable material of the work member so that the desired flow occurs due in part to acoustic softening action.

A further object of the invention is to provide improved apparatus to emboss materials at greatly reduced static forces.

Still yet a further object of the present invention is to provide improved apparatus to emboss more delicate sheet materials with much deeper intaglio or cameo detail.

Still another object of the present invention is to provide improved apparatus to emboss materials with configurations not of a continuous design.

It has been established in the prior art that high-frequency mechanical vibrations do, in fact, soften both metals and plastics. The softening effect in plastics and other materials is described and used in U.S. Pat. No. 3,184,353, issued May 18, 1965, assigned to the assignee of the present invention and in which the present inventor is a coinventor. In the case of metals, the work of Langenecker, as discussed in the report of B. Langenecker et al., entitled "Effects of Ultrasound on Deformation Characteristics of Structural Metals," U.S. Naval Ordinance Test Station, China Lake, Cal., NAVWEPS Report 8482, Mar. 1964, has shown that metals ranging from aluminum to tungsten and including steel and copper, may be rendered plastic by the introduction of ultrasonic vibratory energy alone.

The present applicant has appreciated and pioneered in this work, and has enumerated as a general principle, what may be called the principle of "thermal equivalence." This principle asserts that when a phenomenon is produced primarily by the use of high temperature and heat transfer, then the same phenomenon may be produced by the use of high-frequency mechanical vibrations applied at reduced temperatures. This principle has found many uses in ultrasonics including metal and plastic welding and joining procedures.

Moreover, the applicant has not discovered that the principles of acoustically softening materials with high-frequency mechanical vibrations may be employed in a new and novel way to obtain the ultrasonic embossing of materials in accordance with the present invention, and hereinafter described in greater detail.

In accordance with the present invention, the work member to be embossed is supported in overlapping relationship with a die member having a textured surface, a replica of which is to be reproduced on the surface of the work member. On the opposite side of the work member, the side remote from the die member, the work member is generally supported on a support or backup member so as to apply a static force to the sandwiched work member. The static force is applied in a direction to urge the work and die members against each other into complete continuous interfacial contact. High-frequency mechanical vibrations are simultaneously transmitted to the work member at a predetermined frequency of vibration, which is preferably approximately in the range of 1 kc./sec. and 100 kc./sec., so as to transmit compressional waves to the interface of the die and work member to effect a softening of the work member in contact with the textured die surface. This softening results in the flow of material into the impressions of the die member under the continuous static force. In this manner, a replica of the textured surface of the die member is formed in the work member.

In accordance with another aspect of the invention, for certain embossing operations the die and work members are moved relative to each other along a predetermined path to obtain the desired replica of the textured surface on the work member. If the work member is of an extended length and the embossed design of a shallow depth, then the relative movement between the die and work members is in a plane parallel to the area of overlap. If the depressions of the die surfaces are of a more substantial depth then they may be moved in a plane towards each other a controlled distance to obtain a reproduction of the die surface in the work member.

In accordance with one aspect of the present invention, the high-frequency mechanical vibrations may be transmitted to the interfacial area of the die and work members by means of any elastically conducting path. For example, the vibratory energy may be transmitted directly to the die member, which is preferably constructed of a material having favorable transmission qualities, so that the acoustical waves are transmitted therethrough to the textured die surface. Accordingly, if the material, which may be in either sheet form or a rigid body, to be embossed is a common thermoplastic such as styrene or the like, the compressional waves may be transmitted through the plastic. For the transmission of the elastic waves through the plastic, the support member itself may form the source of vibratory energy as by being coupled to an ultrasonic vibratory assembly.

It is preferable to use compressional elastic waves which will propogate readily through either the die or the plastic, so that the vibration may be applied either through the plastic, to the die member or through the die member to the plastic, depending on convenience of operation. On the other hand if the thermoplastic is of the air-cell expanded type, it is not a good transmitter of elastic wave energy, and so it is preferable in such cases to transmit the energy through the die member, to the thermoplastic body.

In accordance with another aspect of the invention, it is possible by adjusting the frequency and amplitude of vibration, that the apparatus can be used to emboss a variety of materials with a variety of configurations. It is desirable that the interfacial area be situated generally at a loop of compressional waves in the plane substantially normal to the die surface. In this manner, the principle of thermal equivalence may be employed so as to accentuate the softening characteristics of a plastic body when subjected to high-frequency mechanical vibrations and the surface softened to flow into the valleys of the die surface.

Additionally, the work surface to be embossed may be situated substantially at a node of vibration where the stresses are greater to further enhance the softening of the work member.

The term "ultrasonic" as used herein is intended to include acoustic vibrations, for example, at a frequency in the range between approximately 1 kc./sec. and 100 kc./sec. The operating frequency may be in the higher sonic or ultrasonic ranges, preferably in the range between approximately 15 kc./sec. and 30 kc./sec.

The above, and the other objects, features and advantages of the invention, will be apparent in the following detailed description of illustrative embodiments thereof which is to be read in connection with the accompanying drawings forming a part hereof, and herein:

FIGS. 5 and 6 are fragmentary front and side views respectively, but showing another embodiment of the invention wherein the vibratory energy is transmitted to both sides of the work member;

FIGS. 7 and 8 are fragmentary front and side views respectively, but showing another embodiment of the invention, wherein the work member is rotated along the surface of the die member;

FIG. 9 is a view similar to FIG. 7, but illustrating another embodiment of the present invention;

FIG. 10 is a side view, partly schematic of an ultrasonic embossing apparatus, illustrating another embodiment of the invention, and generally used for continuous embossing operations; and FIG. 11 is a sectional view taken along the line 11—11 of FIG. 10.

Similar reference characters refer to similar parts throughout the several views of the drawings and specification.

Figure 1:
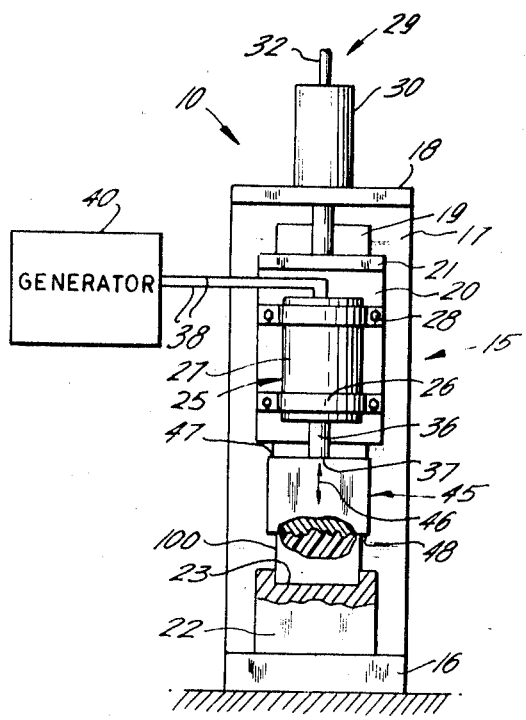
FIG. 1 is a front view of an ultrasonic apparatus according to the invention for embossing a work member.
Figure 2:
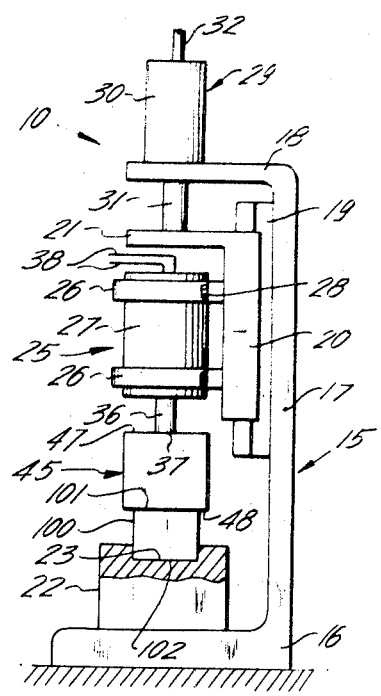
FIG. 2 is a side view, partly in section, of the ultrasonic embossing apparatus of FIG. 1.

Referring to the drawings in detail, and initially to FIGS. 1 and 2 thereof, there is illustrated apparatus 10 for ultrasonically embossing a work member 100. As indicated by the crosshatching in FIG. 1, the work member 100 is of a plastic material, but it will be realized that rigid bodies or sheets of materials such as metal, glass, paper, wood, etc., may be embossed in accordance with the present invention. However, for the purpose of the explanation of the figures to follow, it will be assumed that the apparatus is working with plastic materials.

The basic structure for embossing materials comprises a vibrator support assembly in the form of a support stand 15 that is provided for maintaining the vibrator assembly 25 in proper position, and may include a base 16 with an upright wall 17 extending upwardly from one end of said base and a head 18 extending from the upright wall 17 and in overlapping relationship to the base 16. Mounted on the upright wall 17 is a mounting channel 19 which engages a support block 20 which is slidably connected by a dovetail connection (not shown) to the mounting member 19 to permit vertical movement of the vibrator assembly 25 between the base 16 and head 18 of the support stand 15. The vibrator assembly 25 is suitably secured to the support block 20, for example, by means of bands 26 which encompass the casing 27 of the vibrator assembly and are secured to the support block 20 by means of bolts 28. A support member or mounting fixture 22 of any suitable type for holding the work member 100 is provided on the base 16 and has a recess 23 therein for receiving the work member.

Drive means 29 to effect vertical movement of the vibrator assembly 25 toward and away from the support member 22 is provided and may be in the form of a cylinder 30 vertically mounted to the head 18 and having a shaft 31 extending therefrom and through the head 18 and coupled to a horizontal flange 21 of the support block 20 in any conventional manner. The air cylinder 30 may be operated by supplying compressed air conveyed by a conduit 32 from an exterior source (not shown) and extended from the rear of the cylinder. The exact height of adjustment is generally determined prior to the commencement of the embossing cycle and will determine the depth of the textured surface.

The mechanical vibrator assembly 25 includes a transducer (not shown) which may be any one of a number of electromechanical types, such as, electrodynamic, piezoelectric or magnetostrictive. The operating frequency may be in the sonic or ultrasonic range between approximately 1 kc./sec. to 100 kc./sec. but preferably in the range from 15 kc./sec. to 30 kc./sec. The vibrator assembly 25 is preferably of the type generally disclosed in the U.S. Pat. No. RE 25,033 issued Aug. 29, 1961. The transducer 35 housed within the casing 27 may be cooled as by water or air.

The vibrator assembly 25, generally includes a driver unit made up of a transducer secured to an acoustic impedance transformer or tool 36 that extends from the casing 27. The transducer of mechanical vibrations may comprise a stack of laminations of magnetostrictive material, for example, nickel, and surrounded by a coil winding (not shown) adapted to carry a biased, high-frequency alternating energizing current. The lower ends of the laminations making up the stack of the transducer are fixedly secured, as by welding or soldering, to the upper end of the transformer 36. The transformer 36 has an enlarged section (not shown) in the general area of a nodal plane of motion, and this section constitutes a flange secured to the casing 27.

A biased, high-frequency alternating current is supplied to the winding through conductors 38 extending from a suitable oscillation generator 40, which may be of the type disclosed at page 270 of "Ultrasonic Engineering," by Alan B. Crawford, published 1955 by Butterworth Scientific Publications, London. An oscillation generator of this type is effective to supply a biased alternating current to the winding at a resonant frequency of the driver unit of transducer and is further effective to vary the frequency of the supplied biased, alternating current when the resonant frequency of the driver unit is varied due to changes in temperature, or changes in the loading thereof. Although the frequency of the supplied biased, alternating current is adjusted, in the oscillation generator disclosed in the above identified publication, in response to a feedback signal from a capacitor-type pickup connected in the transducer, it is to be understood that other types of pickups may be employed. Other existing types of oscillation generators may also be employed, for example, as disclosed in U.S. Pat. No. 2,872,578, in which adjustment of the frequency of the alternating current supplied by the oscillation generator is obtained through the use of a feedback signal which varies with the impedance of the transducer.

The lower or output end 37 of tool 36 is coupled to the input end 47 of die member 45 so that when the vibrator assembly 25 is operated, by electrical oscillations supplied from generator 40, compressional waves are generated in the stack of laminations, the tool 36 and die member 45, so as to cause vibrational movements in the vertical direction, that is along the longitudinal axis of the transducer. For the purposes of the present invention, such vibrations preferably have a frequency in the range between approximately 1,000 cycles per second and 100,000 cycles per second, and are of sizable amplitude, for example, in the range between approximately 0.0001 and 0.01 inch. In order to ensure that the maximum amplitude of vibration in the vertical direction is obtained at the lower end or textured die surface 48 of the die member 45, as indicated by the double headed arrow 46, thus ensuring the maximum transmission of working acoustical energy, the overall length of the stack of magnetostrictive laminations, the tool 36, and the die member 45 is selected so that, at the frequency of the electrical oscillations supplied to winding of the transducer, a loop of longitudinal motion of the generated compressional waves occurs at or near the die surface 48 of the die member 45.

The die member 45 as seen in FIGS. 1 and 2 is of a metallic material having good acoustical transmission properties so that the vibrations transmitted from the input surface 47 are propogated through the member to its output die surface 48. The coupling between the output end 37 of the vibrator assembly 25 and the die member 45 may be of any conventional form for example as by a threaded coupling (not shown). If the static force applied between the output end 37 of the tool 36 and the input surface 47 of the die member 46 is of sufficient magnitude then no mechanical coupling between the two is required.

Figure 3:
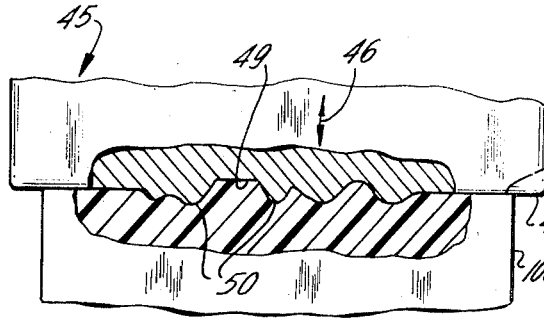
FIG. 3 shows, at enlarged scale, the relationship of the die and work members of FIG. 1, during the embossing operation.

The output surface 48 of the die member 46 may have any number of desired configurations so that a replica of the die surface is embossed on the work member which is generally of a plastic material. As seen in FIG. 3, which is an enlarged view showing the interfacial contact area between the die member 46 and the work member 100 to more clearly illustrate the workings of the present invention, the output surface 48 has a textured surface which consists of a series of valleys 49 and peaks or hills 50 that when blended together with various radii, form a desired surface configuration which is to be reproduced in the plastic member. When the work member 100 is of a rigid plastic body and one side thereof is to be embossed, then the material displaced will flow into the valleys or voids 49 of the textured die surface 48. In a rigid plastic body or sheet of material the material displaced is made to flow due to the acoustical softening characteristics when high-frequency mechanical vibrations are transmitted to the surface 101 of the work member 100. It is preferable that the volume of material displaced in the work member is substantially equal to the voids or cavities within the textured die surface 48. In this manner, the embossed surface of the plastic member is formed and the stresses minimized by supplying sufficient room for the displaced material to flow, expand and contract.

To commence the embossing operation the work member 100 is seated within the support member 22 wherein the lower surface 102 of the work member rests in the recess 23. The die member 45 is then brought into overlapping relationship with the work member 100 so that the textured die surface 48 engages the upper surface 101 of the work member.

To obtain this position, the vibratory assembly 25 is vertically adjusted by means of the drive means 29. The cylinder drive 30 is energized and the shaft 31 extending therefrom vertically adjusts the height of the vibrating assembly through its coupling with bracket 20. While in this position, the oscillator generator 40 is energized to supply current so as to induce high-frequency mechanical vibrations in the transducer that are transmitted through the tool 36 and die 45 to the die surface 48. These high-frequency vibratory motions which are generally in the range of 1 kc./sec. to 100 kc./sec. are applied in a plane substantially normal to the surface 101 of the work member 100. The vibratory die member 45 is maintained in energy-transferring relationship to the work under a static force for retaining the die and work member in complete continuous interfacial contact. If the die surface has a substantial depth, then the static force is continually applied to obtain relative movement towards each other until a complete replica of the configuration of said textured die surface 48 is formed in said work member. As the energy is transmitted to this interfacial area, a gradual softening of the generally plastic work member 100 occurs in accordance with the general principle of thermal equivalence and as this softening and resultant flow of material continues, the vertical movement of the drive means 29 is continually energized so as to continuously form the desired shape of the textured die surface in the work member.

For plastic materials the interfacial area between the die and work members is preferably maintained at a loop of compressional waves in the plane substantially normal to the die surface. When the material being embossed is of a metallic material or other material requiring additional concentrations of energy at the interfacial area the transducer and die member combination may be designed whereas the die surface is substantially at a node of compressional waves in the plane substantially normal to the die surface in accordance with the teachings of applicant's copending application Ser. No. 521,949 filed Dec. 15, 1965 and assigned to the present assignee. The selection of placing the work member at a loop of nodal region is primarily dependent upon the material it is composed of and the depth of the embossed design.

Figure 4:
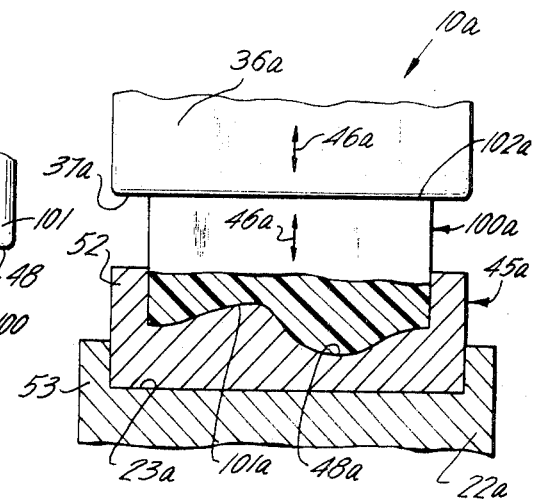
FIG. 4 is a view similar to FIG. 3 showing a different arrangement of the tool, die and work members.

FIG. 4 illustrates another form 10a of the present invention which is essentially similar to the apparatus shown in the embodiment illustrated in FIGS. 1 through 3, except that the high-frequency mechanical vibrations are transmitted from the output end 37a of the tool 36a directly to the work member 100a.

The die member 45a which has a preformed textured surface 48a also acts as a part of the support means and is seated within the receiving recess 23a of the support member 22a. The support member 45a has a peripheral rim 53 which is provided to retain the die member 45a in place prior to and during the application of the high-frequency vibrations. The die member 45a in turn may be provided with an annular rim 52 to retain the work member in position. As seen in FIG. 4, the work member 100a is of a rigid plastic material, such as styrene which is a good transmitter of high-frequency vibrations, and as indicated by the arrows 46a the vibrations are transmitted through the plastic work member 100a to the interface of the die and work members. For those applications, where it is desirable that the vibrations are coupled directly to the work member this form of the present invention may be employed and it has been found that the ultrasonic embossing techniques herein illustrated may be carried out in this manner.

FIGS. 5 and 6 illustrate another embodiment of the present invention 10b wherein it is desired to continually emboss a particular configuration on an extended work member 100b which is either in sheet form or of a rigid body. The die member 45b is maintained in fixed spaced relationship to a cooperating support member 22b, which has at its lower surface coupled thereto a separate tool 36b which also produces longitudinal vibrations, as indicated by arrows 46b, in the support member. The die surface 48b is comprised of a series of valleys 49b and hills 50b which when blended together form a pattern which is to be reproduced on work member 100b. The cooperating support member 22b has corresponding valleys 54 and hills 55 formed in its output surface 51 to mesh with those of the textured die surface 48b. The work member 100b is progressively moved along a fixed path relative to the die and support members, in the direction of arrow 56. In this manner, the embossed design is continually obtained on both sides of the work member.

In vibrating two dies simultaneously it is possible to further reduce the static forces required and obtain at the work site greater quantity of vibratory energy to further enhance the embossing operation.

FIGS. 7 and 8 illustrate another embodiment of the present invention 10c wherein the die member is maintained in a stationary position and also acts as a support member for the work member 100c that is to be embossed. The die member 45c may be in the form of an elongated member supported within a rectangular frame 57. The die member 45c is preferably made of a metal and is physically held within the frame 57 by a plurality of set screws 58 threaded through the frame 57 to engage the die member of 45c.

The die member 45c is set into ultrasonic vibration by a plurality of vibrator assemblies which are shown coupled via their tool 36c to the die member. This arrangement of supporting and driving an elongated member is discussed in U.S. Pat. No. 3,113,225. The work member 100c is in the form of a cylinder that may be a printing roller used in processing a future product, or it may be a manufactured item, for example, a wheel as used on toy automobiles. The work member 100c is supported on shaft 59 which is rotated in the direction of arrow 60 by conventional means not shown herein. The work member 100c is rolled along the die surface 48c under a static force so that the textured surface of the die member may be formed on the periphery 104 thereof. As the work member is rotated the peaks 50c and valleys 49c of the die surface 48c are embossed onto the peripheral surface 104 of the work member to form corresponding peaks 61 and depressions 62 which may have any number of designs.

FIG. 9 illustrates another embodiment 10d of the present invention wherein the work member 100d may be in either sheet form or of a rigid material which is to be embossed on one surface thereof. The die member 45d has a series of valleys 49d and hills 50d which when combined together form the textured surface 48d, a replica of which surface is to be embossed on the work member 100d. In this embodiment the die member also acts as part of the support means during the embossing operation and the high-frequency vibrations, as indicated by arrow 46d, are transmitted directly to the plastic member and through which member the mechanical vibrations are transmitted to the interfacial contact area between the die member and work member.

In operation, the work member 100d is placed in overlapping relationship to the die member 45d, which may be of an elongated form, and the output end 37d of the tool 36d is maintained under a static force against the surface 102d while the opposite side thereof 101d engages the die surface 48d. As the work member and die members are maintained in overlapping relationship the tool 36d is moved across the surface 102d of the work member and the mechanical vibrations 46d are transmitted to the overlapping area. The vibrations progressively effect a softening of the work member to cause it to conform to the surface configuration of the die member 45d under the static force. A series of projections 63 are gradually formed on the work member as the vibratory member 36d is moved along a plane substantially parallel to the textured surface 48d in the direction as indicated by arrow 64. In this manner the embossed design is formed on the work member.

FIGS. 10 and 11 illustrate another form 10e of the present invention, similar to the embodiment illustrated in FIGS. 5 and 6, for use generally when high-speed embossing operations of a continuous design are desired to be performed on sheets or rigid webs, and the embossing is performed on one or both sides of the work member. In order that the textured surface be continuously applied to the work member 100e, a pair of rollers 65 and 66 respectively, are employed.

Roller 65 is comprised of an annular die member 45e in the form of a ring having the textured surface 48e on its outer peripheral surface thereof. The inner surface 47e is coupled to a radially vibrating mechanical assembly 25e (FIG. 10). The opposite roller 66 may have a correspondingly formed surface so that the work member 100e may be embossed on both sides thereof. As seen schematically in FIG. 10, the rollers are mounted on shafts 67 and 68 respectively, which are supported by sideplates 69 that may have ball bearings therein to permit rotation of the shafts 67 and 68. The rollers are maintained in fixed spaced relationship to each other to form a nip or region having a spacing therebetween which is generally equal to or less than the thickness of the work member 100e in the plane substantially normal to the direction of travel of the work member as it is progressively moved along a predetermined path in the direction of arrow 70. As the work member is advanced, it is fed between the peripheral surfaces of the rollers, one of which is simultaneously vibrated in a radial mode and at an ultrasonic frequency. Applicants copending application Ser. No. 464,594 filed May 18, 1965, may be referred to for one means of obtaining the desired radial motion.

The radial vibrator is comprised of a vibrator assembly 25e having its tool (not shown) extending therefrom and coupled to shaft 67. The shaft is provided with a hub 71 substantially at a nodal region of longitudinal motion wherein the radial motion as indicated by the arrows 72 in FIG. 10 is a maximum. Thus vibratory energy is transmitted to the ring shaped die member 45e causing it to vibrate radially and transmit these vibrations in a plane substantially normal to the die surface 48e. The textured peripheral surface is mounted in rolling contact with the work member 100e so that mechanical vibrations are transmitted in a direction substantially normal to the movement of the work member along its predetermined path. In this manner, a replica of the contoured configuration of the die member is formed in the work member. The support member or roller may also have a textured surface that may be complimentary to that of the die member and rotated at the same angular speed as indicated by arrows 73 so that the valleys 49e and hills 50e of the die member will coincide with the valleys 74 and hills 75 of the support member whereby both surfaces may be simultaneously embossed with the same or different designs.

Gears 76 and 77 are mounted on shafts 67 and 68 respectively and motor 78 is secured to end plate 69 and energized in any conventional manner to drive the support member 66, which in turn through the gears the roller 65 is driven.

By employing high-frequency vibratory energy in an embossing process, in accordance with the methods herein, the applicant has found that the static forces required to normally form the embossed surfaces on a work member are substantially reduced. The reason for this reduction is that pressure alone is no longer accountable for the displacement of the material into the embossed configuration. The ability to soften material by employing acoustical energy also permits the embossing of a greater variety of materials at substantially reduced pressures than heretofore possible with the prior art methods. With the present invention, it is also possible to emboss materials in sheet form that are substantially thinner and of a more fragile material as well.

Additionally, the depth of the embossed configuration on a thin sheet may be greater since the static forces are reduced and there is less chance of the sheet tearing under the static forces involved. In addition, the acoustical softening principle may be applied to both plastic and metals as well, so that it is also possible to emboss metalic materials on one or both sides thereof with fine embossed lines at reduced static forces.

Although illustrative embodiments of the invention have been described in detail herein with reference to the accompanying drawings, it is to be understood that the invention is not limited to those precise embodiments, and that various changes and modifications in addition to those mentioned above may be effected therein by one skilled in the art without departing from the scope or spirit of the invention, except as defined in the appended claims.

I claim:

1. Apparatus for embossing a relatively solid work member, comprising
    means for supporting the work member,
    a die member having a textured surface,
    a static force means for urging the textured surface of said die member against said work member, and
    high-frequency vibratory means operatively coupled to said static force means for embossing a replica of said textured surface onto said work member, the frequency being between approximate 1 kc./sec. and 100 kc./sec.

2. Apparatus for embossing a relatively solid work member, comprising,
    an electromechanical transducer vibratory means for supplying high-frequency vibrations in the range of 1 kc./sec. to 100 kc./sec., said vibratory means further including
    an output surface having a textured surface thereon, and
    a static force means for urging the textured surface of said output surface against said work member for embossing a replica of said textured surface onto said work member.

3. Apparatus for embossing a relatively solid work member as in claim 2, wherein said static force means includes a mounting means for displacing said vibratory means relative to the work member.

4. Apparatus for embossing a relatively solid work member as in claim 1, wherein the high-frequency vibratory means includes an electromechanical transducer which vibrates in a direction substantially perpendicular to the plane of the textured surface.

5. Apparatus for embossing a relatively solid work member as in claim 1, wherein said support means includes said die member.

6. Apparatus for embossing a relatively solid work member as in claim 1 further including
    a means for providing relative movement between said work member and said die member resulting in continuous embossing.

7. Apparatus for embossing a relatively solid work member as in claim 1, wherein said support means also has a textured surface so that both sides of the work member may be simultaneously embossed.

8. Apparatus for embossing a relatively solid work member as in claim 2, wherein said output surface is in a generally circular form, and said vibratory means is coupled to said output surface to cause a radial vibration further including
    a means for rotating said output surface as the output surface engages said work member.

9. Apparatus for embossing a relatively solid work member as in claim 1 further including
    a means for effecting movement of the vibratory means relative to the die member and work member in a plane perpendicular to the direction of the vibratory motion.

10. Apparatus for embossing a relatively solid work member as in claim 9, wherein the movement means causes the die member and work member to move conjointly relative to the vibratory means.

11. Apparatus for embossing a relatively solid work member as in claim 2, further including
    a means for effecting movement of the vibratory means relative to the output surface and work member in a plane perpendicular to the direction of the vibratory motion.

12. Apparatus for embossing a relatively solid work member as in claim 11, wherein the movement means causes the output surface and work member to move conjointly relative to the vibratory means.

* * * * *